United States Patent
Recknagel et al.

(10) Patent No.: US 7,305,863 B2
(45) Date of Patent: Dec. 11, 2007

(54) IMPACT SENSOR AND METHOD FOR TESTING THE SAME

(75) Inventors: Rolf-Juergen Recknagel, Jena (DE); Matthias Wellhoefer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/565,182

(22) PCT Filed: Jul. 8, 2004

(86) PCT No.: PCT/DE2004/001479

§ 371 (c)(1),
(2), (4) Date: May 31, 2006

(87) PCT Pub. No.: WO2005/012924

PCT Pub. Date: Feb. 10, 2005

(65) Prior Publication Data

US 2006/0236745 A1    Oct. 26, 2006

(30) Foreign Application Priority Data

Jul. 28, 2003    (DE) ............... 103 34 235

(51) Int. Cl.
*G01P 21/00* (2006.01)
(52) U.S. Cl. ............................................. 73/1.38
(58) Field of Classification Search ............ None
See application file for complete search history.

(56) References Cited

U.S. PATENT DOCUMENTS

| | | | |
|---|---|---|---|
| 5,513,878 A | | 5/1996 | Ueda et al. |
| 6,047,226 A | * | 4/2000 | Wu et al. .................. 701/13 |
| 6,470,249 B1 | | 10/2002 | Schmid et al. |
| 7,057,503 B2 | * | 6/2006 | Watson .................. 340/440 |
| 2001/0037683 A1 | * | 11/2001 | Nozoe et al. ............ 73/504.16 |

* cited by examiner

*Primary Examiner*—Robert Raevis
(74) *Attorney, Agent, or Firm*—Kenyon & Kenyon LLP

(57) ABSTRACT

An impact sensor, or a method for testing the impact sensor. The impact sensor has a sensor element and a filter for filtering the signals of the sensor element. This filter is preferably a low-pass filter. Using a test signal, the filter is tested, and if there is a deviation the filter is corrected using a software filter or through a parametrization of the triggering algorithm.

1 Claim, 5 Drawing Sheets

IMPACT SENSOR AND METHOD FOR TESTING THE SAME

BACKGROUND INFORMATION

German Patent Application No. DE 100 07 422 describes a method for monitoring an acceleration sensor for a vehicle occupant protection system in which the sensor device is supplied with a test signal and the test output signal is compared with a target test output signal. In addition, the dynamic characteristic of the test output signal is examined.

SUMMARY OF THE INVENTION

The impact sensor according to the present invention, and the method according to the present invention for testing an impact sensor, have the advantage that here the filter, preferably a low-pass filter, which is used to filter the sensor signal is separately supplied with a test signal and a filter correction is then carried out as a function of the response signal to the test signal. Any error that is present is also corrected immediately. In particular in filters preferably manufactured in hardware, a deviation of ±10% can occur due to manufacturing tolerances. These deviations, which must be given special attention in safety-critical systems such as a restraint system, can be corrected by the method according to the present invention or by the impact sensor according to the present invention. In particular, with the method or impact sensor according to the present invention it is now possible to use more economical components, having greater tolerances, in the construction of the filter. If deviations of up to 10% can occur, the effect is still more dramatic, in particular in the derivative (derivation) of the signal. It is therefore urgently important to compensate such effects, in particular when such derivatives of the sensor signal are used, for example in the air bag triggering algorithm. According to the present invention, this is accomplished electronically.

It is especially advantageous that the filter correction is achieved using a software filter that is connected directly subsequent to the filter. Alternatively, it is possible to realize the correction through a parametrization of a triggering algorithm for restraint means. For example, the threshold can then be correspondingly increased, or the level of the signal inputted to the algorithm can be increased or decreased.

In addition, it is advantageous that the software filter is realized directly by the impact sensor. In particular in remotely situated sensors, which can be situated for example in the B-pillar or in a side part or on the radiator of the vehicle, this software filter can there already be realized by the sensor electronics themselves, for example by a control logic system or a switch mechanism. However, if the impact sensors are situated in the control device for restraint means, then it is advantageously indicated to realize the software filter through the processor in the control device itself. This possibility is of course also possible for the remote sensors.

Advantageously, the filter correction is carried out after each reset of the impact sensor. This enables a continuous monitoring and checking, as well as correction, of the impact sensor.

In addition, it is advantageous that the deviations of the filter are monitored over a longer period of time, in order to recognize trends, and in order to identify deviations that are far enough away from the target value that an exchange of the impact sensor, or of the filter, or of the control device, is indicated. For this purpose, a signal is produced, for example the illumination of a warning lamp or a message to a remote maintenance station.

Advantageously, as a test signal a step (jump) function can be used, which is particularly easy to produce and which supplies a large quantity of information in the response signal concerning the behavior of the filter.

DETAILED DESCRIPTION

Figure 1:
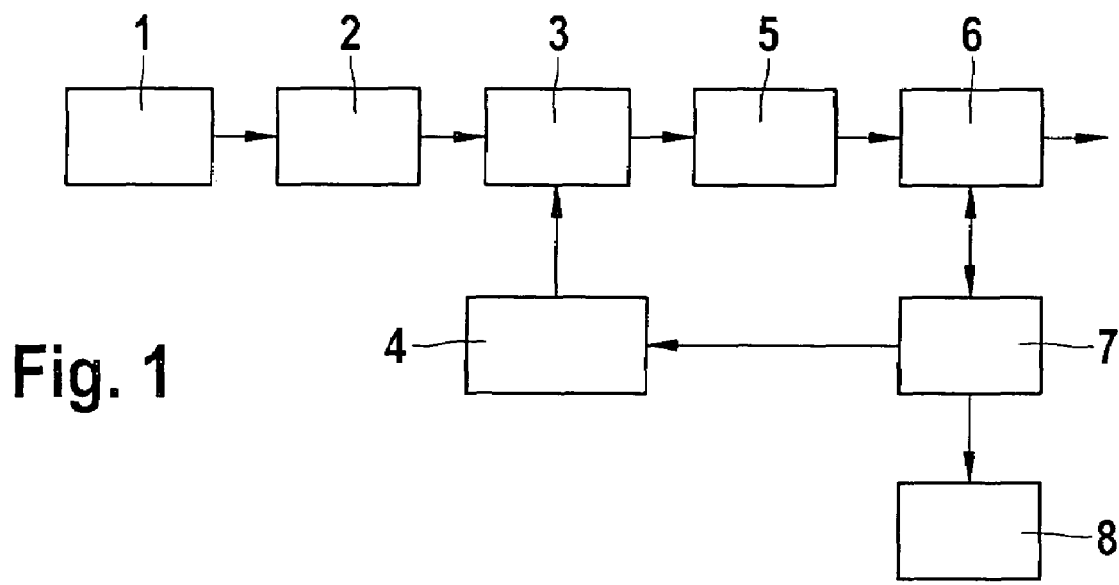
FIG. 1 shows a first block diagram.

In central or also in peripheral crash or impact sensors, low-pass filters are standardly used to filter the signal from the impact sensor. This is necessary because the impact sensors supply signals having a particular frequency spectrum. For the crash discrimination, only a part thereof is really relevant, while higher-frequency portions in particular tend to have a disturbing effect. In the case of resonances, it is even necessary to eliminate these signals from the spectrum, because otherwise these signals can produce serious measurement errors. However, in addition to a low-pass filter a bandpass filter is also possible.

These low-pass filters are realized directly as hardware, because otherwise an excessively high sampling rate would be required to avoid aliasing effects. The realization with discrete components, in particular semiconductors, typically requires a filter tolerance in the range of 10% to the cutoff frequency, because the individual components have a certain tolerance. Deviations of 10% to the cutoff frequency of typical low-pass filters result in deviations in the signal itself. However, the deviations are even more dramatic in their derivatives. The higher the order of the derivative, the greater is the effect, which significantly limits the robustness of the system.

According to the present invention, it is therefore provided to determine the current filter characteristic using a test signal in a self-test. The deviation can then be determined through comparison with the target filter characteristic. Subsequently, the filter characteristic can be corrected through a further process, for example a software filter. This correction using a software filter can be carried out either directly by the impact sensor itself, which is then a self-correcting sensor, or else it can also be carried out by the control device.

The following examples illustrate the principles according to the present invention.

As a test signal, a step function is used. The step function and the associated ideally filtered step response are stored in the impact sensor or in the control device. In an initialization phase, the step function is filtered using the filter and is compared with the ideal target step response. The required correction is determined and is stored in the impact sensor or in the control device. During the normal operation of the impact sensor, the software filter produced in this way for the correction then additionally filters the signal from the sensors filtered by the filter. As a variant, the filter correction can be newly determined each time in the initialization phase after a reset, and can always be stored in a memory. For each newly determined correction, a comparison with the old one can take place, so that the impact sensor can independently recognize changes, for example due to aging and environmental influences. From the absolute deviation from the target characteristic, it can be checked whether the values are still within the specified tolerance limits or not. If this is not the case, a warning lamp can then for example indicate that the restraint system's sensor system is to be tested the next time the car is serviced. Alternatively, it is possible merely to set a service flag that the customer himself does not see; when read at the service station, this flaw is recognized and the correspondingly aged impact sensor can be exchanged. A further alternative is that a signal is sent to a remote maintenance station, for example via a radio connection, in order to indicate this flaw.

As a test signal, a simpler signal can also be used, for example a signal that is zero everywhere, the first data value being one. This is, so to speak, a delta function normed to one, having all possible discrete frequencies in the spectrum with amplitude one. Signal example: 1024 values, first value=1, $2^{nd}$–$1024^{th}$ value=0. If a discrete FFT is now carried out, it is seen that the spectrum is made up entirely of ones. If this ideally selected peak function is filtered and a Fourier transformation is carried out, the transfer function of the filter can be seen directly, if the absolute magnitude is formed. Two Fourier spectra of two different low-pass filters can be seen in FIG. 8. This signal has the advantage that the associated spectrum has all possible discrete frequencies having the same amplitude one. This test signal can now be filtered, and, using criteria such as FWHM (Full Width at Half Maximum), a 10-90 criterion, or the like, the deviation of the filter characteristic can be determined, and the necessary corrections can be derived therefrom.

If more computing power is available, it is possible, using the test signal, to also examine the frequency spectrum, for example with the aid of a simple discrete Fourier transformation. This has the advantage that the deviation of the cutoff frequencies can be read off directly.

Alternatively, it is possible to do without a complete transformation, for example by realizing the following simplified process:

The transform of the filtered test signal is calculated only for a particular frequency, by convolution for example with a sine or cosine function. This takes place in the time continuum, i.e., the integrals are discretely calculated; thus, essentially only additions are to be carried out, resulting in a fast computing speed. Using the deviation obtained at only one frequency, the required correction can easily be determined, for example using a lookup table. The convolution can be further simplified if, instead of the sine or cosine functions, what are known as Walsh functions can be used. This reduces the computing expense to a small number of additions and subtractions.

Alternatively, it is possible to modify the set of application parameters. In this case, the sensor signals are not corrected via a dedicated software filter; rather, the deviation is determined, but is used to adapt the parameters of the thresholds in the algorithm to the deviant sensor data. The signal itself tested in the algorithm can also be correspondingly modified. Furthermore, it is provided to deactivate the sensor element of the impact sensor, or at least to block the signal output of the sensor element, for as long as the transmission characteristic and the deviation from the target state are being determined during the initialization using test signals. In this way, it is ensured that in the determination of the correction no falsifications result, which could for example arise through superposition with a measured signal.

FIG. 1 shows the impact sensor according to the present invention in a first block diagram. A sensor element 1, here the capacitive measurement device of an acceleration sensor that is manufactured micromechanically, is connected to a measurement amplifier 2. Measurement amplifier 2 is connected to a switch 3, which in turn is connected to a low-pass filter 5. Low-pass filter 5 is in turn connected to a module 6 into which an analog-digital converter is integrated, as well as an additional digital control logic system. Module 6 is then connected via an output to a control device, and, via a data input/output, to an additional logical module 7. Module 7 is connected via a first data output to a logical module 4 that is connected to switch 3. Via a second data output, module 7 is connected to a warning lamp 8.

In order to test filter 5, module 7 drives module 4 to actuate switch 3 in such a way that signals from amplifier 2 are no longer sent to filter 5; rather, signals from module 4 are now sent to filter 5. These signals from module 4 are test signals, for example a step function, for testing low-pass filter 5. Module 6 is also informed by module 7 that the test phase for filter 5 is now being executed, so that the signal, i.e. the response signal of filter 5 to the test signal, is transmitted in digitized form from module 6 to module 7, in order to carry out a comparison there of the response signal with a target response signal. The deviation determined by module 7 in this comparison results in a software filter that is intended to correct this deviation. This software filter is integrated in module 6. In addition, module 7 checks this deviation in order to find out whether this absolute deviation is large enough to indicate an exchange of the impact sensor. In this case, module 7 actuates warning lamp 8. Elements 1 to 7 can all be situated in a housing, for example in a peripheral acceleration sensor. Warning lamp 8 is standardly situated in the dashboard of the vehicle. Instead of a software filter, the correction can also be transmitted to the control device via module 6, so that the control device either implements the software filter itself or parametrizes its algorithm for triggering restraint means in such a way that this correction is taken into account in the algorithm. This can for example take place through a modification of the thresholds or through an increase or decrease of the signal level.

Figure 2:
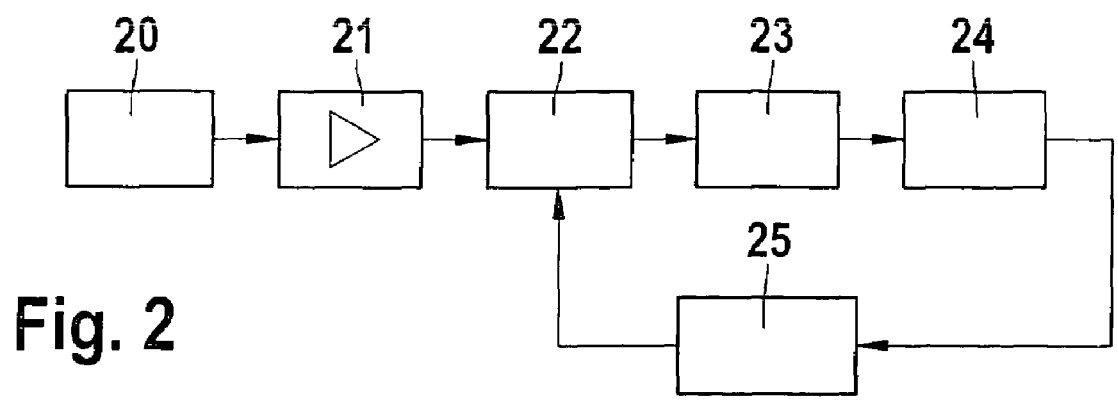
FIG. 2 shows a second block diagram.

FIG. 2 shows a second block diagram of the impact sensor according to the present invention. This time, the correction is carried out by the control device. A sensor element 20, situated for example in the central air bag control device, supplies its signal to an amplifier 21. Amplifier 21 is connected to a switch 22 that is connected to low-pass filter 23. Low-pass filter 23 is connected to a logical module 24, here the microcontroller in the control device. Microcontroller 24 has an analog input for accepting the signal of low-pass filter 23. In the case of a test, microcontroller 24 activates logical module 25, so that switch 22 is actuated in such a way that the signals from amplifier 21 are no longer sent to low-pass filter 23. In this case, a test signal, which is stored in module 25, is sent to low-pass filter 23, and microcontroller 24 carries out the comparison and the evaluation of the response signal to this test signal. The response signal is again compared with a target response signal in order to determine the correction. As described above, the correction then takes place via a software filter or via suitable parametrization of the triggering algorithm.

Figure 3:
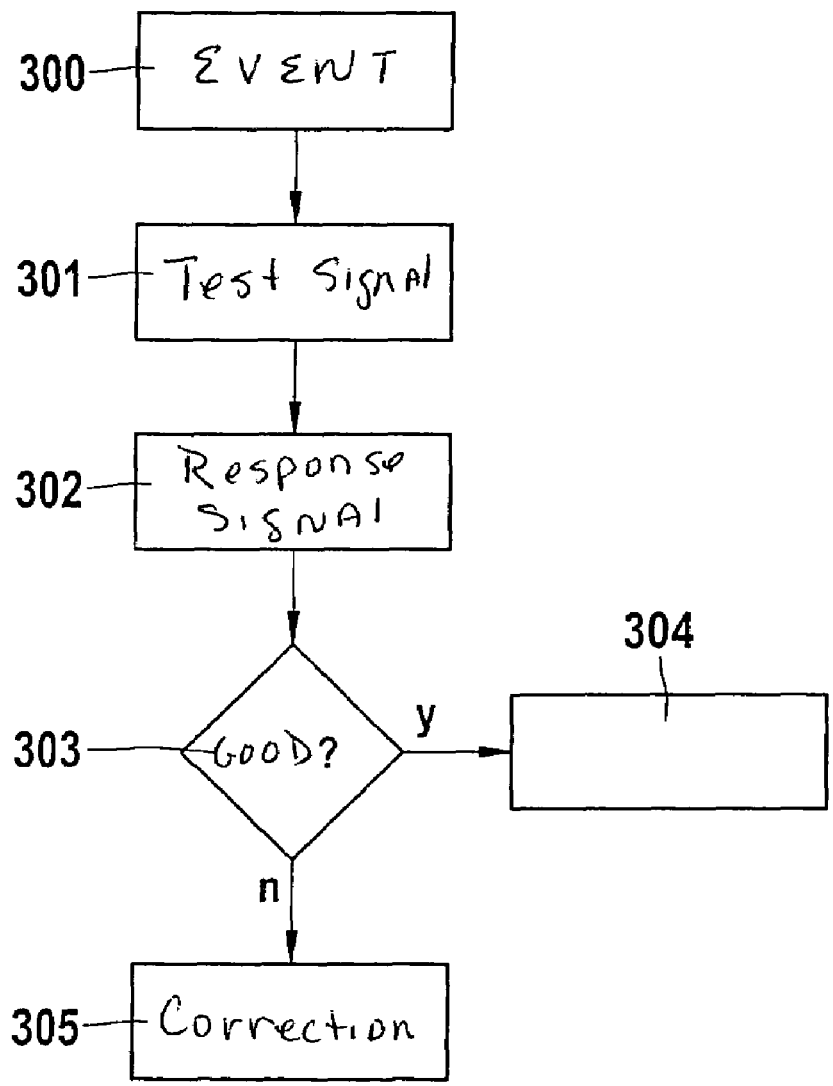
FIG. 3 shows a first flow diagram.

FIG. 3 explains, in a flow diagram, the method according to the present invention for testing an impact sensor. In method step 300, an event occurs that initiates the testing of the filter. This testing can be a reset of the impact sensor or a predetermined initialization phase. In method step 301, as shown above, the test signal is then given to the low-pass filter in order to obtain, in method step 302, the response signal, which is digitized using an analog-digital converter and is then digitally evaluated. In method step 303, this response signal from method step 302 is compared with a target response signal. If the deviation is zero or is very small, no correction takes place, and a jump takes place to method step 304 in order to terminate the method. However, if there is a significant deviation, in method step 305 a correction takes place, either through a software filter or through suitable parametrization of the triggering algorithm.

Figure 4:
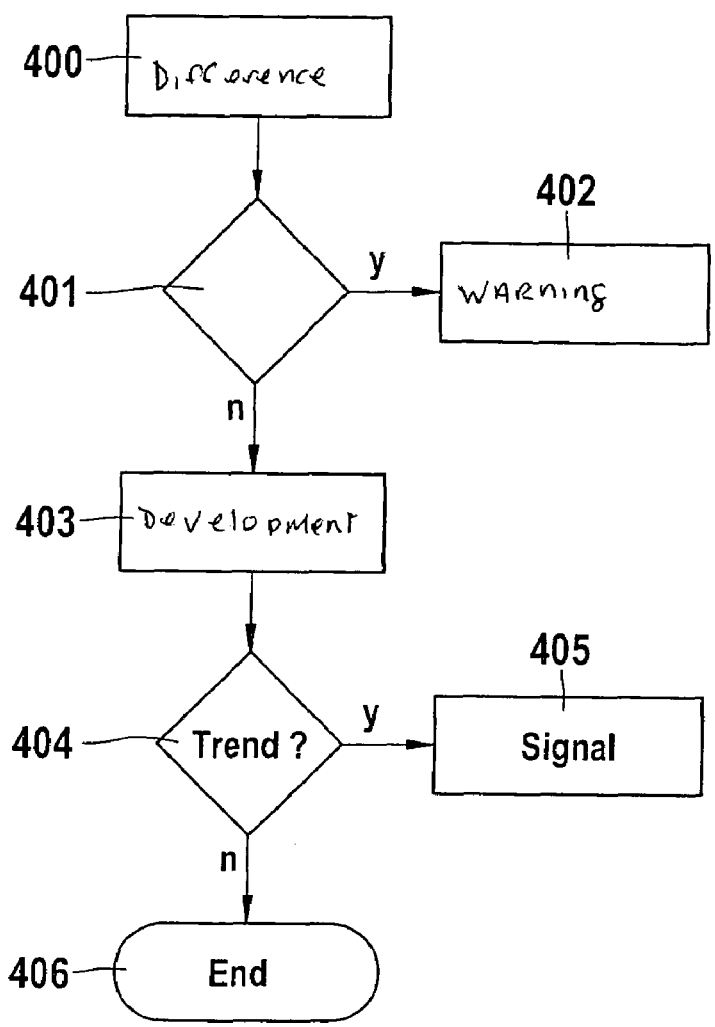
FIG. 4 shows a second flow diagram.

In a second flow diagram, FIG. 4 explains the method according to the present invention for testing an impact sensor. In method step 400, the difference of the response signal from the target response signal is determined. In method step 401, this difference is compared with a threshold value. If the difference is above this threshold value, then in method step 402 a warning is outputted, either, as shown above, by illuminating a warning lamp, or by a signal, a speech signal, or a message to a remote maintenance station. If the difference is below the threshold value, then in method step 403 the development of the deviations over time is examined. In method step 404, it is then checked whether a trend can be drawn from this, for example a continuous aging. This can be expressed as a linear increase of the errors of the filter. However, the increase can also take place according to other functions, such as a power function. If this is the case, then in method step 405 a signal is again produced, in order for example to activate the remote maintenance. If no trend is recognized in method step 404, the method is terminated in method step 406.

Figure 5:
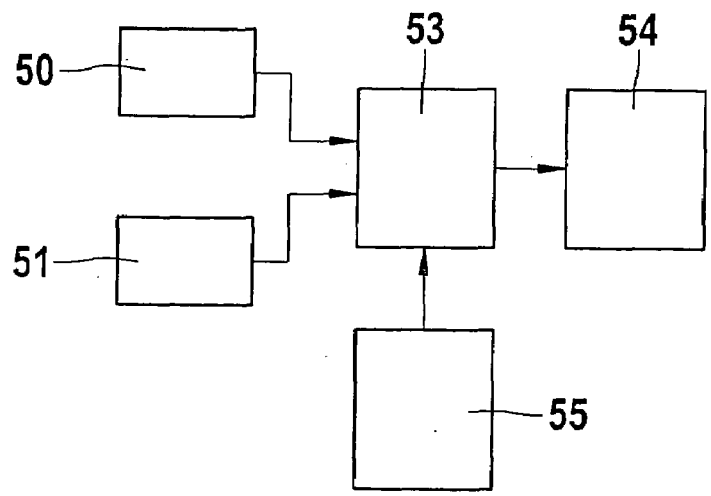
FIG. 5 shows a third block diagram.

FIG. 5 shows, in a third block diagram, the basic configuration of a restraint system. A control device 53 for the restraint means, such as air bags, safety belts, or roll bars, receives via a first data input signals from a remote sensor 50, and receives via a second data input signals from a remote sensor 51, and receives via a third data input signals from a remote sensor 55, which are used to control restraint means 54. The remote sensors are for example acceleration sensors or pressure sensors or contact sensors or pre-crash sensors. Combinations of these sensors are possible. The method according to the present invention can be used for the impact sensors, such as acceleration, pressure, or other contact sensors, because these sensors use a low-pass filter for the filtering of their signals.

Figure 6:
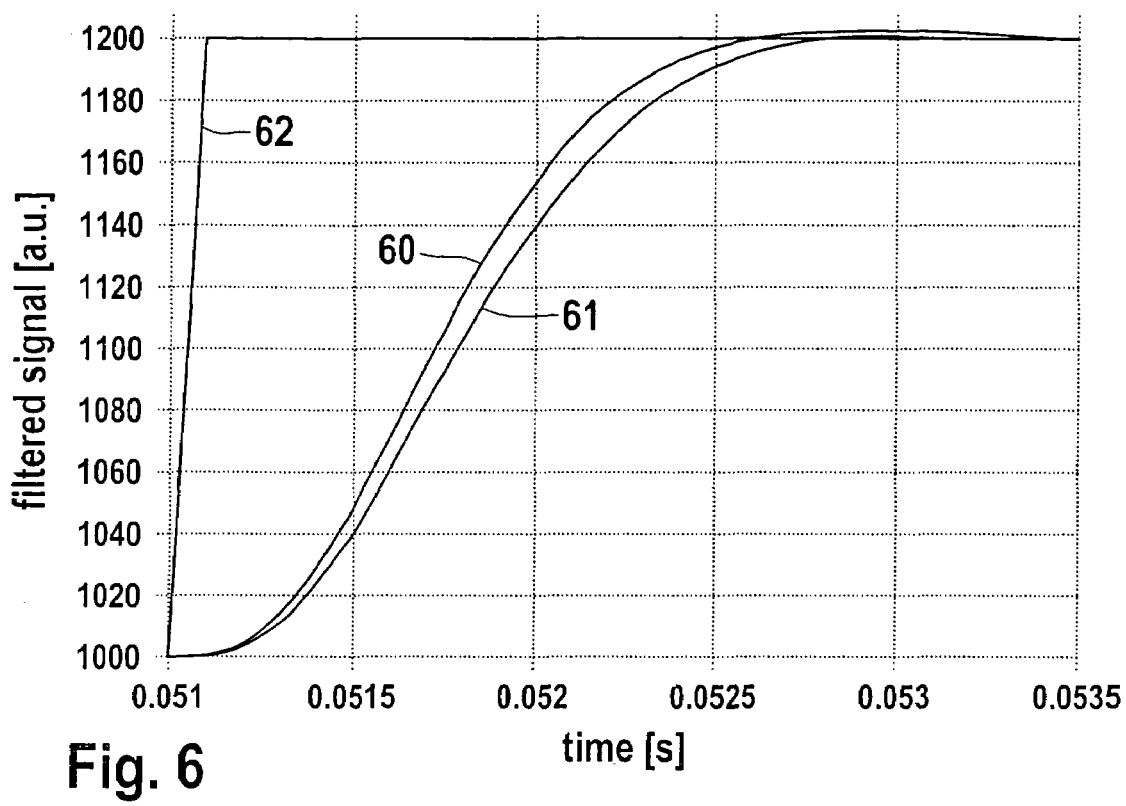
FIG. 6 shows a first signal curve.

In a first diagram, FIG. 6 shows a test signal, as well as the filtered test signal and the target response. As a test signal, here a step function 62 is used. Curve 60 is the filtered step function, while curve 61 is the ideal response function. Here, the signal of a pressure sensor was used, where there is an instantaneous pressure increase from 1000 mbar to 1200 mbar. The deviation between curves 60 and 61 then determines the correction, for example in the software filter.

Figure 7:
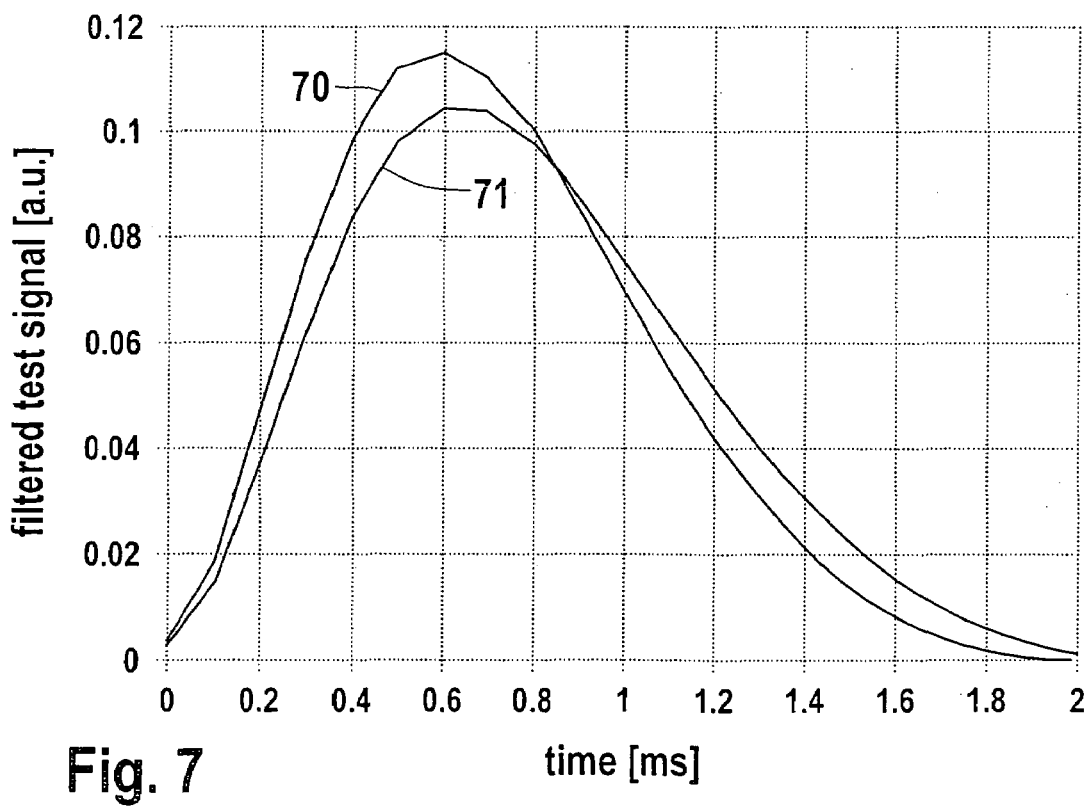
FIG. 7 shows a second signal curve.

In a second diagram, FIG. 7 illustrates an alternative test function, where the first data value is 1 and the remaining data values are zero. Curve 70 represents the filtered test function, while curve 71 is the target response. Here the deviation can be determined by comparing the curves according to various criteria, such as for example peak height and decay to half the value, or a 10-90 criterion.

Figure 8:
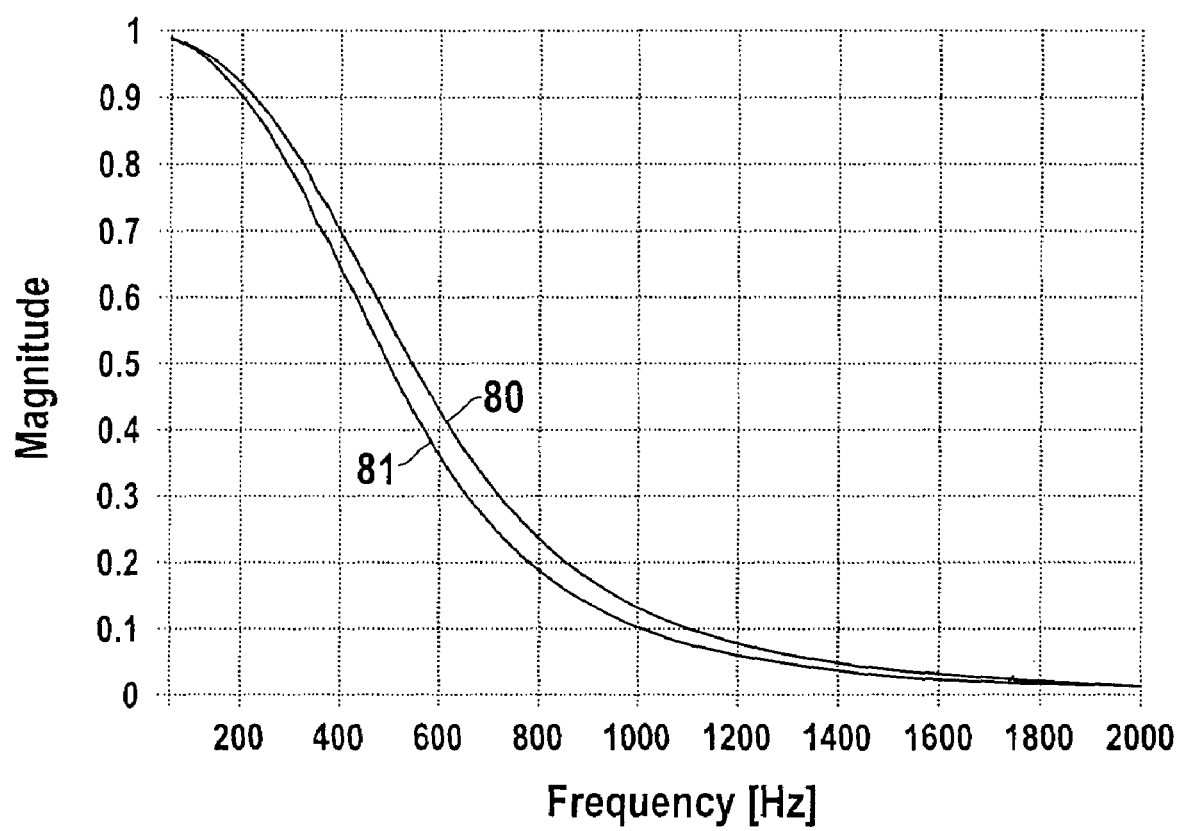
FIG. 8 shows a third signal curve.

In a final diagram, FIG. 8 shows the determination of the deviation of the filter cutoff frequency on the basis of the frequency spectrum of a test function. Here, a normed sample test function is used. The first data value is 1, and the rest of the data values are 0. The function contains all possible discrete frequencies having amplitude 1. Curve 80 shows the frequency spectrum of the filtered test function, while curve 81 shows the target frequency spectrum. In this case, the deviation of the filter cutoff frequency can easily be read off at $1/\sqrt{2}$. In FIG. 8: $1/\sqrt{2}=0.707$. Given an amplitude of 0.707, the 3 dB cutoff frequency of the one low-pass filter in FIG. 8 is approximately 400 Hz (curve 80), and is approximately 380 Hz for the other curve (curve 81).

What is claimed is:

1. An impact sensor configured for a self-test, the impact sensor comprising:
    an impact sensor element for providing a first signal;
    a filter for receiving the first signal of the sensor element; and
    an arrangement for carrying out a filter correction dependent on a response signal of the filter to a test signal, wherein the filter correction is realized as a parametrization of a triggering algorithm for restraint means, and wherein the first signal is used to control the restraint means.

* * * * *